United States Patent [19]

Saito et al.

[11] Patent Number: 4,490,044
[45] Date of Patent: Dec. 25, 1984

[54] AUTOMATIC SLURRY CONCENTRATION CONTROL SYSTEM

[75] Inventors: Makoto Saito, Ibaraki; Masakatsu Sakamoto, Matsudo; Kenji Uchida, Kashiwa; Yukishige Kamino, Ibaraki, all of Japan

[73] Assignee: Hitachi, Ltd., Tokyo, Japan

[21] Appl. No.: 458,924

[22] Filed: Jan. 18, 1983

[30] Foreign Application Priority Data

Mar. 5, 1982 [JP] Japan ................................. 57-33829

[51] Int. Cl.³ ............................................... B28C 7/04
[52] U.S. Cl. ........................................ 366/17; 222/57; 366/21; 366/132; 366/152; 366/160
[58] Field of Search ...................... 366/17, 19, 21, 152, 366/153, 160, 162, 131, 132, 8; 222/57, 129.2

[56] References Cited

U.S. PATENT DOCUMENTS 3,326,536 6/1967 Zingg ................................. 366/17
4,397,561 8/1983 Strong ................................. 366/21

Primary Examiner—Robert W. Jenkins
Attorney, Agent, or Firm—Antonelli, Terry & Wands

[57] ABSTRACT

An automatic slurry concentration control system including a mixing tank filled with a charge of slurry of solids containing water, a clear water tank for supplying clear water, a suction tube of a slurry supply pump located in an opening in a lower portion of the mixing tank, and a movable tube for adjusting the opening of the mixing tank, wherein the concentration of slurry in the suction tube can be controlled by adjusting the movable tube, is provided with a clear water control device. The clear water control device is mounted in the clear water tank for controlling the amount of clear water supplied from the clear water tank in accordance with the amount of slurry delivered from the mixing tank.

7 Claims, 5 Drawing Figures

AUTOMATIC SLURRY CONCENTRATION CONTROL SYSTEM

FIELD OF THE INVENTION

This invention relates to an automatic slurry concentration control system suitable for use with an apparatus for hydraulically transporting solids, especially coarse material, such as a hydrohoist.

DESCRIPTION OF THE PRIOR ART

Figure 1:
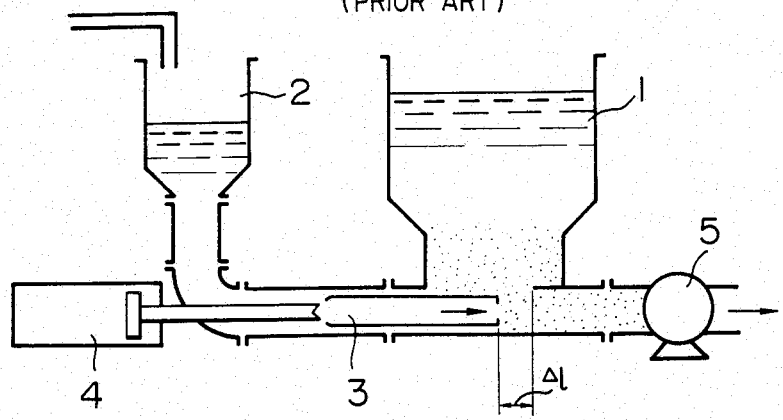
FIG. 1 is a schematic view of an automatic slurry concentration control system of the prior art, showing its construction.

In this type of automatic control system, it has hitherto been the usual practice to control an amount $\Delta l$ of an opening in a lower portion of a mixing tank 1 by a movable tube 3 actuated by a cylinder 4 to move in the direction of an arrow to increase or decrease the amount of a slurry containing sand or other solids in the mixing tank 1 that is delivered through the opening and at the same time to mix the delivered slurry with clear water supplied from a clear water tank 2 so as to control the concentration of the slurry on a suction side of a slurry supply pump 5. In this system, the amount of clear water supplied from the clear water tank 2 is kept constant.

The amount of solids in a slurry delivered through the opening of the mixing tank 1 is not constant at all times. More specifically, sand and other solids charged in the mixing tank 1 are compressed by the pressure of sand that is piled in a stack. Thus when solids that are hardened drop to the opening, the amount of delivered solids decreases. The amount of delivered solids increases when the hardened solids disintegrate. Because of this, it has hitherto been impossible to control the concentration of a slurry to be constant at all times irrespective of the amount of solids in the slurry because the amount of clear water supplied from the clear water tank 2 is constant at all times.

In an apparatus for hydraulically transporting solids, such as a hydrohoist, it is essential that the concentration of a slurry transported be kept constant at all times. If the slurry concentration were too high, the slurry pump 5 and movable tube 3 would be obturated; if it were too low, transportation efficiency would drop. The problem with regard to wear being caused on the slurry pump 5 and piping would be raised. In an application in which a slurry is supplied to a hydrohoist, a reduction in the resistance offered by the piping would increase the amount of slurry delivered by the slurry pump 5 if the concentration of the slurry delivered from the mixing tank 1 were too low. The result of this would be that the leading end of a charge of slurry filling a supply tube of the hydrohoist, not shown, would reach a change-over valve, not shown, so that it would become necessary to close the change-over valve while the slurry exists in the valve. This would cause wear to occur excessively in the change-over valve. It would be a fatal defect of a hydrohoist in evaluating its usefulness that the change-over valve and the movable tube have a short service life.

SUMMARY OF THE INVENTION (1) Object of the Invention

This invention has as its object the provision of an automatic slurry concentration control system capable of increasing the efficiency with which a slurry is transported hydraulically while preventing wear that might otherwise be caused on accessory equipment.

(2) Statement of the Invention

The aforesaid object of the invention is accomplished by providing, in an automatic slurry concentration control system comprising a mixing tank filled with a charge of slurry of solids containing water, a clear water tank for supplying clear water, a suction tube of slurry supply pump located in an opening in a lower portion of the mixing tank, and a movable tube for adjusting the opening of the mixing tank, wherein the concentration of slurry in the suction tube can be controlled by adjusting the movable tube, the clear water tank with a clear water control device for controlling the amount of clear water supplied from the clear water tank in accordance with the amount of slurry delivered from the mixing tank.

DETAILED DESCRIPTION OF THE PREFERRED EMBODIMENT

Figure 2:
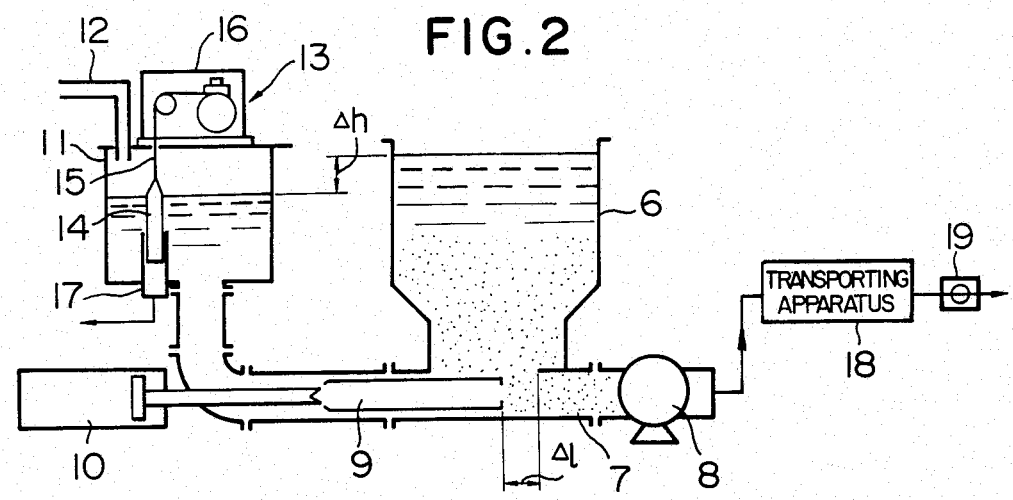
FIG. 2 is a schematic view of the automatic slurry concentration control system comprising one embodiment of the invention, showing its construction.
Figure 3:
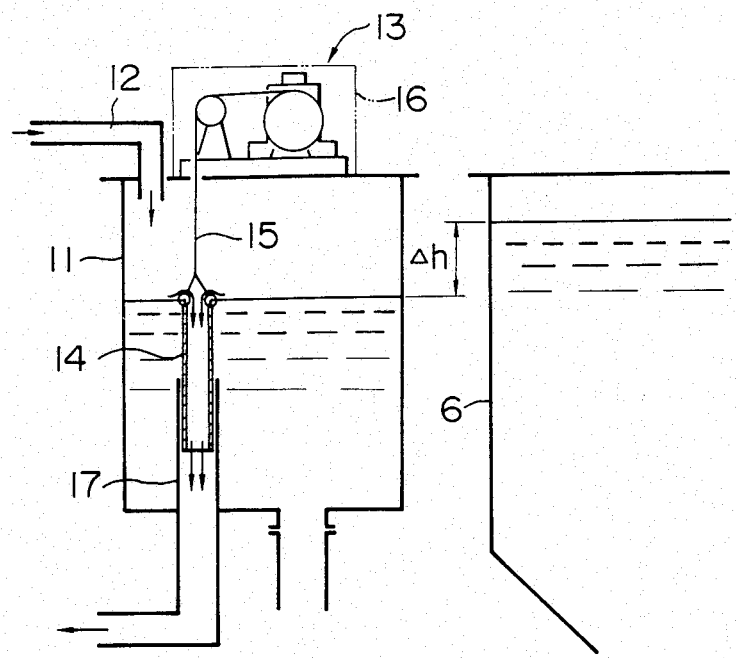
FIG. 3 is a view showing in detail the liquid level adjusting means of the automatic slurry concentration control system according to the invention.

A preferred embodiment of the invention will now be described by referring to the accompanying drawings. In FIGS. 2 and 3, the numeral 6 designates a mixing tank having a charge of slurry of sand or other solids containing water supplied from above through its upper portion, and the numeral 7 designates a suction tube mounted for communication with an opening in a lower portion of the mixing tank 6 at one end thereof and with a suction side of a slurry supply pump 8 at the other end thereof. A movable tube 9 is mounted in alignment with the center axis of the suction tube 7 for back-and-forth movement as a hydraulic cylinder 10 is actuated to adjust the size of the opening in the lower portion of the mixing tank 6, while allowing clear water to flow through its interior. A clear water tank 11 communicating with the suction tube 7 receives a supply of clear water through a clear water supply line 12 at all times. A clear water control device 13 is mounted in the clear water tank 11 for producing a liquid level differential $\Delta h$ (pressure differential) between the mixing tank 6 and the clear water tank 11 to control the amount of clear water supplied from the clear water tank 11 in accordance with the amount of slurry delivered from the mixing tank 6. The clear water control device 13 is constructed as follows. A liquid level member 14, which may be in the form of a pipe, for determining the liquid level of the clear water tank 11 and producing a liquid level differential between the clear water tank 11 and the mixing tank 6 is connected at its upper end to a control motor 16 through a wire 15. A drain member 17 for discharging excess clear water that has overflowed when the liquid level of the clear water tank 11 has exceeded a predetermined liquid level is connected to a lower end of the liquid level member 14.

Referring to FIG. 2 again, the numeral 18 designates an apparatus for hydraulically transporting solids, such as a hydrohoist, connected to a discharge side of the slurry supply pump 8, and the numeral 19 designates a sensor sensing the concentration of a body of slurry delivered by the apparatus for hydraulically transporting solids 18, respectively.

Figure 4:
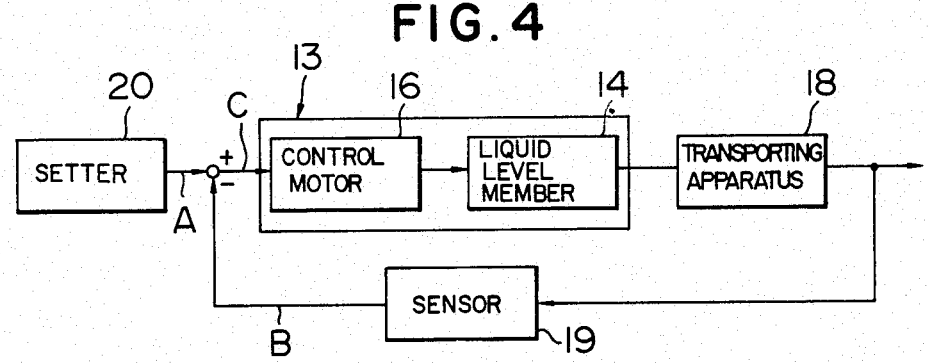
FIG. 4 is a block diagram of the control means for controlling the amount of clear water supplied to the automatic slurry concentration control system according to the invention.

FIG. 4 is a block diagram in explanation of control means of the clear water control device 13. The device comprises a slurry concentration setter 20 for setting a predetermined concentration for a slurry depending on its type which produces a signal A indicating a concentation of slurry that has been set and is operative to compare the signal A with a signal B produced by the slurry concentration sensor 19 for indicating a concentration of slurry that has been sensed, to thereby produce a differential signal C which operates the control motor 16 which in turn controls the movement of the liquid level member 14 in a vertical direction.

Operation of the control system according to the invention will be described. First, they hydraulic cylinder 10 is actuated to move the movable tube 9 to adjust the amount l of the opening in the lower portion of the mixing tank 6 in accordance with the characteristics of the charge of slurry in the mixing tank 6, and then the movable tube 9 is rendered stationary.

A predetermined slurry concentration is set by the slurry concentration setter 20 in accordance with the characteristics of the slurry. If the slurry is delivered through the opening in the lower portion of the mixing tank 6 in large amounts, the concentration of the slurry in the suction tube 7 wuld become higher than the predetermined slurry concentration that has been set. The concentration of the slurry is sensed by the slurry concentration sensor 19 mounted on the discharge side of the apparatus for hydraulically transporting solids 18. The control motor 16 of the clear water control device 13 is actuated by the differential signal C representing the differential between the signal A indicating the predetermined slurry concentration that has been set and the signal B indicating the slurry concentration that has been sensed, as shown in FIG. 4. At this time, the control motor 16 moves the liquid level member 14 through the wire 15 in a direction in which the liquid level differential $\Delta h$ decreases or in an upward direction. This allows the liquid level member 14 to reduce the liquid level differential $\Delta h$ between the mixing tank 6 and clear water tank 11, to thereby increase the amount of clear water supplied from the clear water tank 11 to the suction tube 7 and bring the concentration of the slurry in the suction tuve 7 to a level near the predetermined slurry concentration that has been set. When the concentration of the slurry in the suction tube 7 becomes equal to the predetermined slurry concentration that has been set, movement of the liquid level member 14 is interrupted by the control motor 16. Once the liquid level member 14 is correctly positioned, excess clear water supplied through the clear water supply line 12 overflows through the liquid level member 14 and is discharged through the drain member 17.

Control of clear water is effected by determining the liqid level of the clear water tank 11 and keeping the liquid level differential $\Delta h$ between the mixing tank 6 and clear water tank 11 constant.

When the amount of slurry delivered through the opening in the lower portion of the mixing tank 6 is small, the concentration of the slurry in the suction tube 7 drops below the predetermined slurry concentration that has been set. When this is the case, the control motor 16 is actuated in such a manner that the liquid level member 14 is moved in a direction in which the liquid level differential $\Delta h$ increases or in a downward direction.

Figure 5:
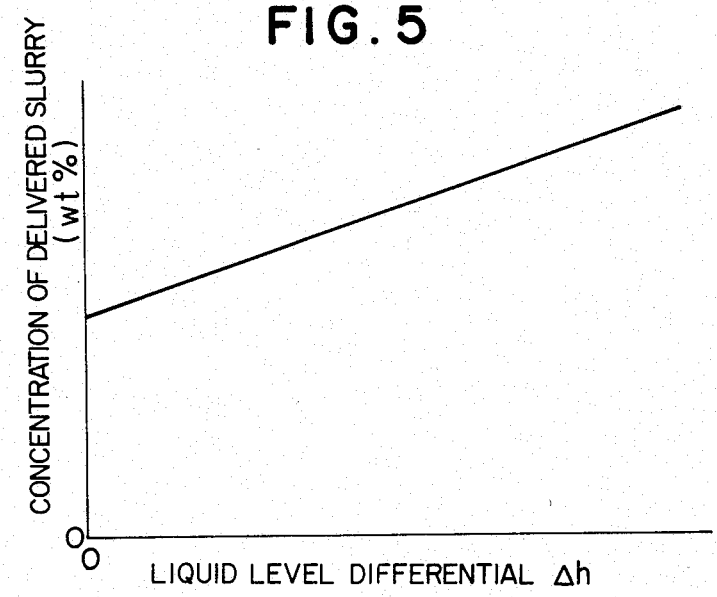
FIG. 5 is a diagrammatic representation of the relation between the liquid level differential and the concentration of the delivered slurry.

FIG. 5 shows data obtained by conducting experiments on the relation between the liquid level differential $\Delta h$ and the concentration of the delivered slurry (wt%) from the apparatus for hydraulically transporting solids 18. In the figure, in which the opening of the movable tube 9 remains constant, it will be seen that control of the concentation of the delivered slurry can be effected by controlling the liquid level differential $\Delta h$.

In the embodiment of the invention shown and described hereinabove, the clear water control device 13 effects control in accordance with the differential between the predetermined slurry concentration set by the setter 20 and the concentration of the delivered slurry sensed by the sensor 19 on the delivery side of the apparatus for hydraulically transporting solids 18. It is to be understood that the invention is not limited to this specific control process and that control may be effected in accordance with a differential between a predetermined slurry concentration that has been set and a slurry concentration sensed at the suction tube 7 of the slurry supply pump 8.

From the foregoing description, it will be appreciated that in the automatic slurry concentration control system according to the invention, the amount of clear water supplied from the clear water tank is controlled in accordance with the amount of slurry delivered from the mixing tank and the slurry concentration on the suction side of the slurry supply pump is kept at a concentration level that has been set. This is conducive to greatly increased slurry transportation efficiency and prevention of wear that might otherwise be caused on the slurry pump, valve, movable tube, piping and other accessory equipment.

What is claimed is:

1. In an automatic slurry concentration control system comprising:
    a mixing tank filled with a charge of slurry of solids-containing water;
    a clear water tank for supplying clear water;
    a suction tube of a slurry supply pump located in an opening in a lower portion of the mixing tank; and
    a movable tube for adjusting the opening of the mixing tank,
    wherein the concentration of slurry in the suction tube can be controlled by adjusting the movable tube; the improvement comprising:
    a clear water control device provided for the clear water tank to the suction tube for controlling the amount of clear water supplied from the clear water tank in accordance with the amount of slurry delivered from the mixing tank.

2. An automatic slurry concentration control system as claimed in claim 1, wherein said clear water control device comprises a liquid level member in the form of a pipe for deciding the liquid level of the clear water tank, and a control motor connected to said liquid level member through a connecting member to vertically move the liquid level member in accordance with the concentration of slurry.

3. An automatic slurry concentration control system as claimed in claim 1, wherein said clear water control device is actuated in accordance with a differential between a concentration of slurry sensed on a delivery side of the slurry supply pump and a concentration of slurry set beforehand.

4. An automatic slurry concentration control system as claimed in claim 1, wherein said clear water control device comprises a setter for setting slurry concentration at a predetermined concentration level, and a sensor for sensing a concentration of slurry on a delivery side of an apparatus for hydraulically transporting solids, whereby the clear water control device can be actuated in accordance with the differential between the slurry concentration set beforehand and the slurry concentration sensed.

5. An automatic slurry concentration control system as claimed in claim 1, wherein said clear water control device includes means for controlling the level of clear water in said clear water tank to produce a liquid level differential between said clear water tank and said mixing tank.

6. An automatic slurry concentration control system as claimed in claim 5, wherein said means for controlling the level of clear water in said clear water tank is adapted to control the amount of clear water supplied from the clear water tank in accordance with the amount of slurry delivered from said mixing tank.

7. An automatic slurry concentration control system as claimed in claim 1, wherein said clear water control device controls the amount of clear water supplied from the clear water tank to the suction tube in accordance with the amount of slurry delivered from the mixing tank to the suction tube.

* * * * *